Aug. 3, 1965 L. J. FINLAYSON ETAL 3,198,048

METHOD OF FORMING CODED CARDS FOR DATA-PROCESSING MACHINES

Filed Feb. 19, 1962 2 Sheets-Sheet 1

INVENTORS
LOGAN J. FINLAYSON
EMMET H. CAGLEY
BY
[signature]
ATTORNEYS

Aug. 3, 1965 L. J. FINLAYSON ETAL 3,198,048

METHOD OF FORMING CODED CARDS FOR DATA-PROCESSING MACHINES

Filed Feb. 19, 1962 2 Sheets-Sheet 2

INVENTORS
LOGAN J. FINLAYSON
EMMET H. CAGLEY
BY
ATTORNEYS

United States Patent Office 3,198,048

Patented Aug. 3, 1965

3,198,048

METHOD OF FORMING CODED CARDS FOR DATA-PROCESSING MACHINES

Logan J. Finlayson, Denver, and Emmet H. Cagley, Adams County, Colo., assignors to W. H. Kistler Stationery Company, Denver, Colo., a corporation of Colorado Filed Feb. 19, 1962, Ser. No. 173,891

5 Claims. (Cl. 83—36)

This invention relates to coded cards of the type used to program electronic or electro-mechanical data processing machines together with the methods employed in fabricating same.

Cards including some type of coded indicia in the form of punched holes, magnetic ink, notched edges and the like are widely employed in automatic data processing equipment to program the machine so as to deliver the desired information. These code cards also duplicate the coded information in printed form so that the operator can make efficient use thereof without having to learn and decipher the code.

The data-processing machines that utilize these coded cards as the means by which they are programmed require extremely precise register between the code-forming indicia and the particular elements of the machine that are actuated thereby. This is particularly true of the punched-hole-type code cards which customarily function to actuate a selected group of microswitches by moving them from a normally open into closed position against a spring bias while allowing the remaining switches to stay open. Now, if any misalignment of the code holes and the associated microswitches or similar functional element of the machine occurs, it becomes obvious that the correct group of switches will not be actuated and the machine becomes improperly programmed. The fact that this has occurred may or may not be indicated by the data delivered and, in any event, malfunctions of this type should be avoided if at all possible.

Accordingly, it becomes of utmost importance to manufacture the coded programming cards to extremely precise tolerances so that the difficulties of the type mentioned briefly above can be avoided. These tolerances are critical both with regard to the size and shape of the card as well as the location of the code-forming indicia in relation to these dimensions.

The data-processing machines that are programmed by these coded cards include a minimum of two guide-forming stops that engage adjacent edges of the card and locate the code-forming indicia carried thereby in proper relation to the elements of the machine to be actuated. This means, of course, that the two stop-engaging edges bear a critical relationship to the code-forming indicia and the dimensional spacing therebetween must be maintained to extremely precise tolerances. Obviously, when only two adjacent edges of each card engage stops and are, therefore, critical, it becomes possible to blank out four cards at a time from a single sheet of stock and still maintain the desired relationship between the stop-engaging edges and the code-forming indicia. This can be accomplished by leaving the four cards joined together along only their non-critical edges for later separation by conventional stack-cutting methods while forming the critical edges thereof with the blanking die along the outside edges of the card stock. It happens, however, that many of these machines are so designed that the elements actuated by the code-forming indicia are located so that only one-half of the card need be coded. This means that a complete set of cards can be eliminated by doubling-up on each card so that two separate codes are carried by each one. In other words, the top half of the card would carry one code and the botton half another so that the machine would be programmed differently depending upon which of the two codes was used as the means for actuating the sensing elements. In actual practice, this is accomplished by reversing the card top-for-bottom or side-for-side so that the printed deciphers of the two codes appear on opposite faces rather than opposite halves of the same face. The net result of this "doubling-up" approach is to make a third edge critical insofar as its space or dimensional relationship to the code-forming indicia is concerned. When this is the case, the maximum number of cards that can be blanked out of a single sheet of stock while still preserving the dimensional tolerances between the three critical edges and the code-forming indicia is reduced from four to two as the only remaining non-critical edge that can be gang-cut and along which the cards can remain joined together is the single edge that at no time comes into contact with a guide-forming stop in the machine.

Carrying this "doubling-up" concept one step further, it is also posible to utilize only a quarter of the card for each code so that four different ones can appear on the same card. By utilizing a square card, it is possible to place as many as eight separate codes on a single card; however, from the standpoint of dimensional criticality, the same problems are involved with four as eight. In the four-code card, the usual arrangement is to place the first code in the upper left hand quadrant and the printed decipher therefor along the top-half reading right side up. The second code would be placed in the lower right-hand quadrant and its decipher along the bottom half of the same face but upside down. Thus, to utilize the second code, the card would be turned 180° to bring the bottom edge to the top but not flipped over. The third code would be located in the upper right-hand quadrant or, to be more accurate, the upper left-hand quadrant with the card flipped over. This would place the decipher for the third code on the back upper-half of the card reading right-side-up as was the case with the first decipher. Finally, the fourth code would appear in the lower left hand quadrant, i.e. the lower right-hand corner with the card reversed face-to-face. Its decipher would be on the lower-half of the back of the card upside down.

Now, in this situation, where the card is used with the same face up and reversed edge-for-edge and also flipped over face-for-face, it becomes apparent that all four edges bear critical relationships to one or more of the code-forming indicia. It was felt, hertofore, that because all four edges were critical, the cards had to be blanked out one-at-a-time if the precise tolerances required were to be maintained.

Perhaps the most widely used of the data-processing machines that is programmed by a punched card carrying four separate and distinct codes is one wherein the guide-forming stop that engages the bottom edge of the card is of the non-continuous or interrupted type having spaced supports that contact the card edge along only a portion of its overall length. It has now been found in accordance with the teaching of the instant invention that two rectangular programming cards having four critical edges and carrying four or more separate codes can, in fact, be blanked from a single sheet of card stock provided the data-processing machine in which they are to be used employs at least one non-continuous stop of the type aforementioned. This is accomplished by slotting the stock along the common edge between the two cards forming an accurate edge and each positioned to engage the interrupted stop while, at the same time, leaving the two cards connected by a shared tab that can be gang-cut following the printing operation to separate the cards. This tab is located so that it does not contact the non-continuous stop in the data-processing machine; therefore, the accuracy with which it is cut is immaterial as long as the edges defined by the slots are not altered.

It is possible with a suitable die to blank out both cards of the pair thereof from a single sheet of stock with a single stroke of the die leaving them connected to one another only along their common tabs; however, the savings realized by so doing when compared with blanking the two cards separately out of the same piece of stock are not appreciable, especially when the increased cost of a double-card die over a single is considered. The real savings come from being able to print both cards at the same time while they remain joined together by the connecting tab and also the substantial reduction in handling the cards two-at-a-time. Savings up to fifty percent are being achieved at the present time by utilizing the present methods when compared with the prior art method by which the cards were cut and printed singly.

It is, therefore, the principal object of the present invention to provide a novel and improved rectangular coded programming card for data processing machines together with the methods employed in cutting all four edges thereof to exact dimensions.

Another object is to provide a method for fabricating coded cards wherein a pair of cards are cut in end-to-end face-up relation from a single sheet of stock and remain joined along a common edge while being printed.

Still another object is to provide an improved punched-hole-type coded programming card specifically adapted for use in data-processing machines having at least one interrupted card-positioning guideway or stop.

An additional objective of the invention is the provision of a card-cutting method capable of producing programming cards having four critical edges and four or more separate codes that maintain dimensional tolerances several times more accurate than have been achieved heretofore with other methods.

Further objects of the invention are to provide a method of manufacturing punched cards that is simple, efficient, extremely accurate, foolproof, consistent and capable of utilizing existing production equipment except for the special cutting dies involved.

Other objects will be in part apparent and in part pointed out specifically hereinafter in connection with the description of the drawings that follow, and in which.

Figure 2:
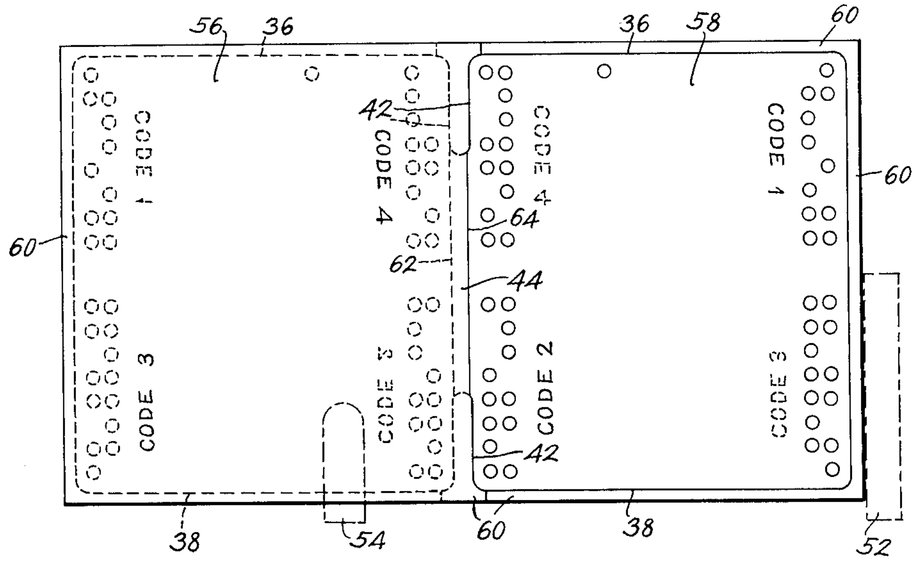
FIGURE 2 is a plan view similar to FIGURE 1 showing the sheet of stock following the second cut that forms the other of the two cards in end-to-end face up relation to the first but joined thereto along a portion of their common edge to form a connecting tab.
Figure 3:
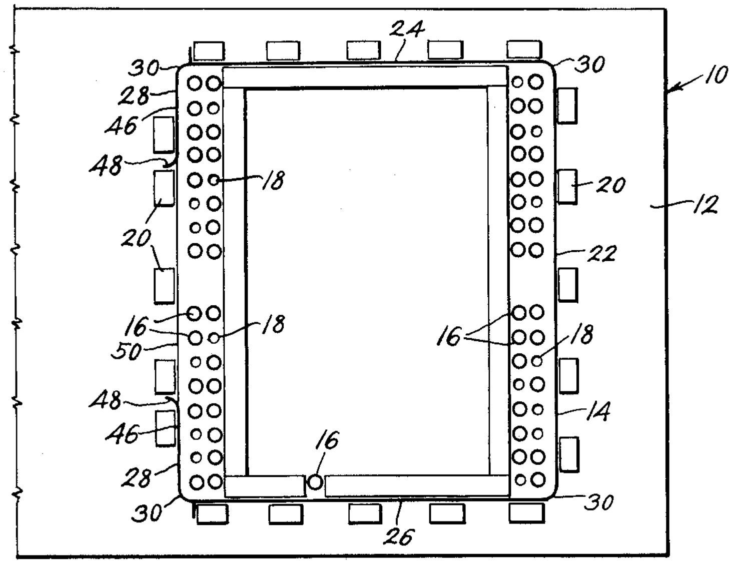
FIGURE 3 is a plan view of the cutting die used to produce the cards.

Referring now to the drawings for a detailed description of the present invention and, in particular, to FIGURE 3 for this purpose, the cutting die which has been indicated in a general way by reference numeral 10 will be seen to comprise a base-plate 12 to the top surface of which is attached an upstanding edge-forming knife 14 and a plurality of removable hole-punching cutters 16 arranged to produce four separate and distinct codes, one in each of the four quadrants. The arrangement of the four codes and their printed deciphers (not shown) follows the conventional practice that has already been described in considerable detail and which has been identified in FIGURES 1, 2 and 4 as "Codes" 1, 2, 3 and 4. These hole-cutters or punches 16 are screwed or otherwise removably attached to the base-plate because they provide the means by which the codes are changed. For example, in the the drawings, reference numeral 18 identifies the punch-mounting holes in the baseplate and, where no punch is shown, a blank will appear on the card.

In the particular form illustrated herein, the areas of the die containing the hole-cutters and edge-forming knife are bordered by wooden blocks 20 topped with sponge rubber that projects above the cutting edges in position to engage the card and hold same in accurate position while it is being cut. The rubber, of course, compresses to the extent required to permit the knife and cutters to contact the card and perform their respective functions. The particular shape and arrangement of these compressible holding elements 20 is a matter of choice and may be varied considerably to suit individual needs.

Figure 1:
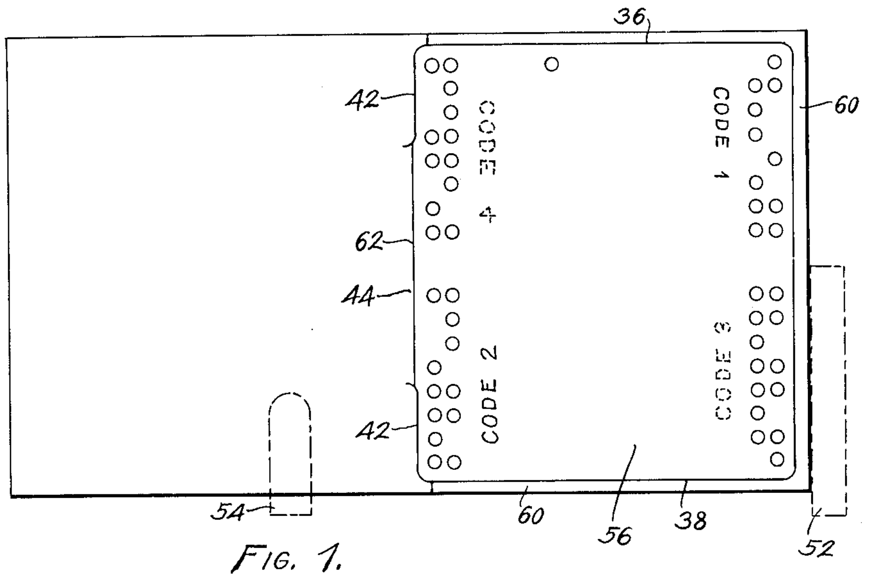
FIGURE 1 is a plan view showing the initial cut made in the sheet of card stock which forms the first of the two cards.
Figure 4:
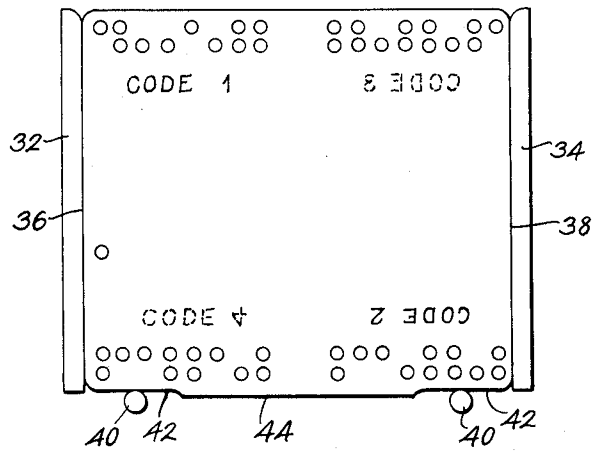
FIGURE 4 is a plan view similar to both FIGURES 1 and 2 showing one of the finished cards after the excess stock has been removed from its margins, it has been printed and subjected to the third and final cut which separates same from its companion card.

The edge-forming knife 14 is the most critical part of the die as it enables the method to be employed by which a pair of cards can be blanked from the same sheet of stock in face up end-to-end relation with all four edges precisely located relative to the code-forming indicia. At this point, it should be mentioned that while FIGURES 1 and 2 show the card lying on its side and FIGURE 3 reveals the die in the same position, it being the one actually used during the cutting operation, for purposes of clarity it is desirable to describe both the card and die in relation to one of the four positions the card occupies in the data-processing machine, i.e., that shown in FIGURE 4. Thus, portion 22 of the edge-forming knife 14 located to the right in FIGURE 3 will be referred to as the "top" of the knife because it forms the top edge of the card when in position as shown in FIGURE 4. Similarly, the upper and lower horizontal portions of the knife that have been designated by reference numerals 24 and 26, respectively, form the left and right side margins of the card; whereas, the left-hand portion 28 forms the bottom edge.

The side-edge forming portions 24 and 26 of the knife are located in spaced parallel relation to one another and are primarily joined to both the top and bottom-edge-forming portions 22 and 28 by rounded corners 30 that prevent the corners of the card produced thereby from becoming "dog-eared" through continued use and handling. The top-edge forming portion 22 is continuous and substantially parallel to the interrupted bottom-edge-forming portion 28. As has already been mentioned, all four of the edges of the die, including the interrupted edge 28, must produce edges on the card bearing a very precise relationship to at least one of the codes produced thereby. Ordinarily, stops engaging two adjoining edges of the card are required as a minimum, preferably the bottom and one side edge. If, on the other hand, the card enters the machine through a slot in the side thereof, stops may be provided to engage both the top and bottom edges as well as one side edge. Similarly, as is the case with the coded card illustrated in the accompanying drawings which is the type to be inserted through a top-opening slot, guide-stops are provided along both side edges, and on the bottom as shown in FIGURE 4 which will be discussed in detail presently. In any event, the spacing between all four edges and the four sets of code-forming holes becomes critical.

Now, if these cards are cut one-at-a-time and completely separated from the stock, these dimensional relationships present no particular problem to maintain within the allowable tolerances and they become merely a function of the accuracy of the die. Even when fabricated two-at-a-time in face-up end-to-end relation, the problems associated with locating the punch holes accurately with respect to the side and top edges are no greater than those encountered when making the cards singly for obvious reasons, however, the common bottom edge does cause real difficulties and it is to this phase of the manufacturing process that the invention is primarily directed.

Before describing in detail the interrupted bottom edge 28 of the die knife, it will be well to explain briefly the structure of the stop on the machine that is engaged thereby which makes the two-at-a-time face-up method workable. With reference to FIGURE 4 of the drawings, it will be seen that the stop-forming guides 32 and 34 of the machine that engage the side margins 36 and 38 of the card are continuous; whereas, stop 40 that supports and engages the bottom edge 42 is of the interrupted type having at least two spaced points or areas of contact. In the particular form shown, stop 40 consists of a pair of pins located on opposite sides of the vertical centerline adjacent the lower corners. Therefore, as long as those sections of the bottom edge 42 that actually engage stop 40 are accurately located with respect to the side edges, top edge and punched holes, it makes no difference whatsoever how inaccurately the remaining tab-forming section 44 is cut, because it performs no function as far as positioning the card is concerned. In the particular form shown a single so-called "tab section" 44 separates the spaced stop-engaging sections 42 of the bottom edge and it is this tab section that provides the common connecting web for the two cards. It is quite obvious that more than one tab section could be provided separating several accurately cut stop-engaging sections if the requirements of the machine were such that more than two spaced supporting stops 40 were used. Also, it is possible that a machine could employ an interrupted stop on an edge other than the bottom edge which would be continuous and, if this is the case, the cards should be joined together along the edge that is to engage the interrupted stop rather than the one shown.

Thus, referring once again to FIGURE 3, it will be seen that the bottom or interrupted edge-forming portion 28 of knife 14 comprises a pair of relatively short sections 46 joined to the bottom ends of side-edge-forming portions 24 and 26 by curved corners 30 and extending inwardly therefrom in aligned but spaced relation terminating in free ends 48 that curve away from the top knife edge 22. Knife 14, therefore, makes a continuous cut along the top and both side margins of the card but leaves a tab 44 uncut along the bottom edge thereof between sections 46 of the blade. These sections 46 are parallel to the top knife edge 22 and essentially perpendicular to the side edges thereof.

From an examination of FIGURE 3, it will be noted that a knife blade 50 also depends from the baseplate extending between the curved end portions 48 of bottom-edge-forming sections 46 of the main blade. Blade 50, however, has its cutting edge recessed slightly beneath the edge of the main blade and, therefore, it does not cut through the card stock but merely embosses a line on the connecting tab 44 indicating the location of the final cut which will separate the two cards one from the other once the printing operation has been completed. Actually, this auxiliary blade can be eliminated altogether. When used, however, it should emboss the cut-off line on the tab outside the interrupted edge defined by sections 46 of the main blade if the severing cut is to be made in this line; otherwise, the accurate bottom edge 42 of the card will be removed and the close tolerances to which the card is cut will be destroyed.

The die blanks out only one card per impression and, therefore, covers only one-half of the baseplate. The actual manufacturing operation is perferably carried out on a platen-type printing press which automatically feeds the stock onto the platen, aligns it, makes the cut, and restacks the once-cut cards. Thereafter the cards are turned over end-for-end and fed once again through the press to blank the second card. Each cut, however, produces all four codes. Code 1 is on the face of the card in the upper left-hand corner. Code 2 is upside down on the same face of the card as Code 1 but in the lower right-hand corner. Code 3 is impressed on the same face of the card as Codes 1 and 2 in the upper right-hand corner and right-side-up; however, the holes that form same are arranged to be read by the machine when the card is flipped over face down, or more properly, to the rear as indicated by the dotted lines. Similarly, Code 4 is punched from the front face of the card in the lower left-hand corner. It is both upside down and reversed so as to be read in the upper left-hand corner by the machine when the card is flipped over placing the front face to the rear and also the top and bottom edges reversed as indicated by the upside down dotted line lettering "Code 3."

The sequence of operation will now be set forth in detail in connection with FIGURES 1, 2 and 4. The baseplate is mounted in the press with a die on either side although for purposes of the present description it will be assumed that the die is on the right as shown in FIGURE 3. A stack of blank cards cut to provide a small border of between approximately ⅛ and ¼ inch is placed in the pick-up portion of a platen press. As the press is set into operation the cards are picked up one-at-a-time by the over-hanging fingers provided on such machine and placed down on the bed of the press when one side edge and the bottom edge are engaged by aligning stops provided for the purpose and which have been indicated more or less schematically in FIGURES 1 and 2 by reference numerals 52 and 54. These stops locate the blank card in correct relation to the die and form no part of the present invention as they are standard equipment on a platen press. As the press closes, the die engages the card and blanks out the first card 56 as shown in FIGURE 1; whereupon, it is removed and stored in a second stack of once-cut cards.

Next, with the die still in the same position, the stack of once-cut cards is turned over end-for-end to place the first card 56 on the left side face down in the hopper of the press preparatory to blanking out the second card. The operation is then repeated to blank out the second card 58 in end-to-end adjoining relation to the first card 56 as shown in FIGURE 2. Tab 44 remains uncut and connects the bottom edges of both cards together.

At this point it should be mentioned that insofar as making a card to the exact size required is concerned, it makes no difference where it is located relative to the edges of the blank card so long as it does not fall outside the border of the card or move over onto the other half and interfere with the second card. In other words, assume that the blank is not fully seated against either of the stops 52 and 54 when the first card 56 is blanked out. The precise relationship between the stop-engaging edges thereof and the punched holes is unaffected and, when the second card is blanked out, all that changes is the width and perhaps the shape of tab 44 which has no effect on the proper registry of the card in the machine. From another standpoint, namely, subsequent forming operations, it is preferable to have both cards located rather accurately with respect to the borders of the blank card as this simplifies the trimming operations, removal of the disks from the die-cut holes and separating the cards along the connecting tab 44.

Before separating the cards, the borders 60 are trimmed therefrom and discarded. While these borders have been cut all the way through the card, they generally remain in place until pulled away by hand. This can be done a stack-at-a-time and need not be done to single cards.

Next, the cards are placed by the stack in a suitable jig (not shown) provided for this purpose which holds the stack square, aligns the die-cut holes vertically and provides holes underneath each of the possible hole locations to receive the disks removed therefrom. A simple pin-type punch is then gently driven through each punched hole to remove the disks therefrom.

Following the trimming operation, the cards are printed two-at-a-time resulting in substantial savings in both time and labor. It is most important that the cards be printed before they are separated one from the other as it is this operation in which the major economies are realized. The cutting operation utilizing a single-cut die to blank out only one card at a time from a piece of stock capable of producing two cards offers little, if any, advantage over cutting out one card in its entirety if it were not for the advantages realized in the printing step.

Finally, the entire stack of trimmed, stacked and printed cards is placed on a cutter which separates the first and second cards along tab 44. As aforementioned, it makes no difference at this point that the cutter leaves more of a tab on one card than another as the tab has no effect on the ultimate registry of the cards in the data-processing machine. From a practical standpoint, two severing cuts are usually made, one along embossed line 62 at the base or bottom of cards 56 and a second along embossed line 64 (FIGURE 2) of second card 58 to remove the tab 44 left thereon. As long as these severing cuts are made outside interrupted edge 42, they cannot affect the dimensional accuracy of the card.

FIGURE 4, of course, shows the finished card as it is used in the data-processing machine where it is held in transverse alignment by stops 32 and 34 and supported in vertical alignment by interrupted stop 40.

Having thus described the several useful and novel features of the coded programming cards and methods used in forming same, it will be seen that the many worthwhile objectives for which they were developed have been achieved. Although but one specific embodiment of the card and method of fabricating same have been illustrated and described in connection with the accompanying drawings, we realize that other designs and methods may well occur to those skilled in the art within the broad teaching hereof; hence, it is our intention that the present invention be limited only to the extent such limitations are set forth expressly in the appended claims.

What is claimed is:

1. The method of forming a duplicate pair of substantially rectangular cards from a single generally rectangular sheet of card stock which comprises the steps in sequence of, first die-cutting not more than one-half of the sheet to sever three of the four edges of a single card therefrom while leaving said card connected to said sheet along an intermediate portion of the fourth edge located adjacent the transverse centerline of the sheet, said connecting portion forming a tab interrupting the fourth edge between its ends and extending along said transverse centerline of the sheet, second die-cutting the other half of the sheet to sever three of the four edges of a second card therefrom while leaving said second card connected to the first by means of said common tab-forming portion, and, third, separating the two cards by cutting along the interconnecting tab so as to leave the partially-formed fourth edges of both cards intact.

2. The method as set forth in claim 1 including the operations of die-cutting a plurality of code-forming apertures in one face of each card simultaneously with the formation of the edges thereof and thereafter applying a printed decipher of the code simultaneously to the face of both cards prior to separating one from the other.

3. The method as set forth in claim 1 including the step of turning the sheet of card stock upside down and reversing same end for end between the steps of forming the edges of the first and second cards.

4. The method as set forth in claim 1 including the steps of removing the severed borders and any card stock material remaining within the die-cut apertures following formation of both cards but before they are separated one from the other.

5. The method as set forth in claim 2 including the step of turning the sheet of card stock upside down and reversing same end for end subsequent to formation of the first card and the apertures therein but before the second card is formed.

References Cited by the Examiner

UNITED STATES PATENTS

| | | | |
|---|---|---|---|
| 354,170 | 12/86 | Myers | 83—36 X |
| 609,007 | 8/98 | Butler | 101—227 |
| 1,105,995 | 8/14 | Nichols | 234—21 |
| 1,942,145 | 1/34 | Knight | 83—682 |
| 2,141,121 | 12/38 | Attwood | 83—917 X |
| 2,180,331 | 11/39 | Hughes | 83—36 |
| 2,200,886 | 5/40 | Kuhn | 83—903 X |
| 2,207,650 | 7/40 | Winkle | 83—903 X |
| 2,596,911 | 5/52 | Nelson | 83—620 X |
| 2,625,223 | 1/53 | Lund | 83—903 X |
| 2,648,381 | 8/53 | Engel | 83—36 |
| 2,655,212 | 10/53 | Stewart | 83—917 X |
| 3,026,029 | 3/62 | Daniels | 235—61.12 |
| 3,034,712 | 5/62 | Mead | 235—61.12 |

ANDREW R. JUHASZ, *Primary Examiner.*

WILLIAM W. DYER, Jr., MALCOLM A. MORRISON, *Examiners.*